United States Patent
Buzinkai et al.

(10) Patent No.: US 8,501,900 B2
(45) Date of Patent: Aug. 6, 2013

(54) NYLON RESINS AND PROCESS

(75) Inventors: John F. Buzinkai, Chattanooga, TN (US); Leen Monster, TD Zuidland (NL); Charles Richard Langrick, Middlesbrough (GB)

(73) Assignee: Invista North America S.A R.L., Wilmington, DE (US)

( * ) Notice: Subject to any disclaimer, the term of this patent is extended or adjusted under 35 U.S.C. 154(b) by 161 days.

(21) Appl. No.: 12/852,013

(22) Filed: Aug. 6, 2010

(65) Prior Publication Data

US 2011/0190442 A1 Aug. 4, 2011

Related U.S. Application Data

(60) Provisional application No. 61/232,631, filed on Aug. 10, 2009.

(51) Int. Cl.
*C08G 69/42* (2006.01)
*C08G 69/26* (2006.01)
*C08L 67/00* (2006.01)
*B29C 45/00* (2006.01)

(52) U.S. Cl.
USPC ........... 528/337; 528/288; 528/343; 524/607; 264/328.1

(58) Field of Classification Search
USPC ........................ 528/288, 337, 343; 524/607
See application file for complete search history.

(56) References Cited

U.S. PATENT DOCUMENTS

| 3,113,843 A | 12/1963 | Li |
| 3,595,829 A * | 7/1971 | Davy ............................ 524/117 |
| 5,663,284 A * | 9/1997 | Kominami et al. ........... 528/310 |
| 5,824,763 A | 10/1998 | Pagilagan |
| 5,929,200 A | 7/1999 | Pagilagan |
| 6,191,251 B1 | 2/2001 | Pagilagan |
| 7,491,763 B2 * | 2/2009 | Aramaki et al. .............. 524/437 |
| 2003/0091823 A1 | 5/2003 | Presenz et al. |
| 2011/0028628 A1 * | 2/2011 | Martens et al. ................ 524/387 |

FOREIGN PATENT DOCUMENTS

| EP | 0976774 | 3/2004 |
| WO | WO02/28941 | 4/2002 |
| WO | WO2007/036929 | 4/2007 |

OTHER PUBLICATIONS

Jacobs and Zimmerman, "Chapter 12: Preparation of 6,6-Nylon and Related Polyamides" from Poly. Processes, edited by Charles Schildknect, John Wiley & Sons (1977), pp. 443-444.

* cited by examiner

*Primary Examiner* — Tae H Yoon

(57) ABSTRACT

The disclosures herein relate to a polymer such as nylon 66, having low yellowness and excellent whiteness retention for applications in melt extrusion and injection molding where an increase in molecular weight is not desirable. The polymer is prepared with a phosphorus compound content, e.g., a sodium hypophosphite (SHP) content, in an amount of 150 to 300 ppm by weight. The presence of an "end cap" additive such as one selected from acetic acid, propionic acid, benzoic acid, or succinic acid, added at the start of polymerization, effectively mitigates undesired molecular weight gain.

10 Claims, No Drawings

NYLON RESINS AND PROCESS

CROSS-REFERENCE TO RELATED APPLICATION

This application claims benefit of priority from U.S. Provisional Application No. 61/232,631, filed Aug. 10, 2009. This application hereby incorporates by reference U.S. Provisional Application No. 61/232,631 in its entirety.

FIELD OF THE INVENTION

The disclosures herein relate the preparation of modified nylon polymer molding resins and to the use of such resins in a system of melt injection molding. More particularly these disclosures relate to nylon resins used in molding processes where there exists a variability in the resin moisture content prior to melting and in the duration of time in the melted state.

BACKGROUND OF THE INVENTION

A process is known from U.S. Pat. No. 6,191,251 (R. U. Pagilagan and assigned to Du Pont) for reducing the initial yellowness and improving the color stability of a polyamide composition by using a phosphorus compound while preventing the polyamide from increasing significantly in molecular weight during subsequent processing by deactivating the catalytic effect of the phosphorus compound. The Pagilagan disclosures relate to preparing a polyamide composition from an amino acid or a diamine and a diacid, comprising polymerizing at least one polyamide-forming reactant in the presence of, or introducing into a polyamide melt, (a) a phosphorus compound which does not have a direct carbon-phosphorus bond selected from the group consisting of (1) phosphorous acids, (2) phosphorous acid salts selected from the group consisting of phosphorous acid salts of Groups IA and IIA, manganese, zinc, aluminum, ammonia, and alkyl and cycloalkyl amines and diamines, and (3) phosphorous organic esters which undergo hydrolysis in the presence of water to form inorganic phosphorous acids or salts; and (b) a Group IA base selected from hydroxides, oxides, carbonates, bicarbonates, alkoxides, and hydrides.

Similarly, a process is known from U.S. Pat. No. 5,929,200 (R. U. Pagilagan and assigned to Du Pont) for preparing a polyamide composition comprising polymerizing at least one polyamide-forming reactant to form nylon 6,11,12,66,69,610,612 or copolymers thereof, in the presence of, or introducing into a polyamide melt: a phosphorus compound selected from the group consisting of (1) phosphorous acids; (2) phosphorous acid salts selected from the group consisting of phosphorous acid salts of Group IA and IIA, metals, manganese, aluminum, ammonia, and alkyl and cycloalkyl amines and diamines; and (3) phosphorous organic esters which undergo hydrolysis in the presence of water to form inorganic phosphorous acids or salts; and (b) a multivalent metal compound selected from the group consisting of carboxylate and water soluble compounds of Group IIA metals, zinc or aluminum.

It is known that polyamide resins useful in molding and extrusion applications experience undesirable color build-up (i.e., increase in yellowness) on storage and significant molecular weight increases during subsequent melt processing. Similarly, it is known that when polyamide resins are manufactured conventionally without the addition of pigments (e.g., titanium dioxide white pigment) such resins exhibit varying degrees of yellowness in initial color, increasing in yellowness over time. Exposure to high temperatures during subsequent melt processing operations contributes to increased yellowness. During molding and extrusion applications, resins can be subjected to repeated melting, in the form of regrind, which generally results in the molded or extruded resin exhibiting increased yellowness. Therefore, taking into consideration a potential for the prolonged storage time for these resins and the repeated melting during molding and extrusion, there exists a need for improved polyamide resins which initially appear and, over time, maintain a less yellow appearance than known resins.

A known approach to reduced yellowness in polyamides is to use certain phosphorus compound additives. Such phosphorus compounds are color stabilizers for the polyamides and believed to reduce the degree of oxidative and thermal degradation. However, these phosphorus compounds also serve as polymerization (polyamidation) catalysts. Polyamides, containing these phosphorus compounds which act as polymerization catalysts, when subjected to melting temperatures in an extruder or molding machine, undergo rapid polymerization. This polymerization results in an increase in molecular weight as measured by increased relative viscosity (RV). The RV increase is particularly rapid when remelting polyamide resins dried to a condition of low moisture ($H_2O$) content. As a consequence, an increase in molecular weight of the polymer and decreased melt flow of the polyamide is observed. In molding and extrusion applications, such a decrease in melt flow of the polyamide is undesirable.

The known phosphorus compound additives to reduce yellowness in polyamides include phosphorous acids, their salts, and their organic esters. Examples of these phosphorus acids include: hypophosphorus, orthophosphorus, pyrophosphorus and diphosphorus acids.

Furthermore, it is known that this catalytic effect of certain phosphorus compounds on a polyamide polymerization process may be reduced or completely stopped. This deactivation or reduction of the catalytic effects of certain phosphorus compound in the polymer is known to be controllable through the use of certain bases, e.g., sodium bicarbonate, potassium bicarbonate, potassium hydroxide, and sodium hydroxide.

It is also known that this catalytic effect of certain phosphorus compounds on a polyamide polymerization process may be reduced or completely stopped using multivalent metal compounds in the polyamide. This catalyst deactivation effect is obtained from use of multivalent metal salts of phosphorous acid, acetates, stearates and water soluble halides and include the metals: calcium, zinc, barium, manganese, and aluminum.

It is also known that the molecular weight of polyamide material produced, for example, by the polymerization of hexamethylene diamine and adipic acid can be controlled by addition of materials which function as a chain terminator. It is disclosed for example in Jacobs and Zimmerman, "Chapter 12: Preparation of 6,6-Nylon and Related Polyamides" from Polymerization Processes, Edited by Charles Schildknect, John Wiley & Sons, (1977) at Pages 443-444 that a conventional route to molecular weight control during nylon-66 polymerization (no mention of catalyst) is by the addition of monofunctional amines or acids, Such materials are said to act as chain terminators which reduce the average molecular weight of the polyamide produced. Acetic acid is said to be a commonly used chain terminator.

To summarize the known practice, for polyamide polymerization, at least without a phosphorus compound present, use of a chain terminator can act to control molecular weight increase of the polymer produced. When a phosphorus-based anti-yellowing agent is present, prevention of the polymer from increasing in molecular weight during subsequent melt processing has only been shown to be provided by deactivating the catalytic effect of the phosphorus compounds present in the nylon resins. As a result, the amount of phosphorus compound provided to nylon resin is limited by the amount of catalyst deactivation required. Thus, the requirement in the known art to is to include deactivating materials in the polymer. The approach of catalyst deactivation ultimately competes with the beneficial effects of the phosphorus compound to provide initial yellowness and improving the color stability.

While the objective to provide nylon resins used in molding processes with thermal stability and a resistance to yellowing is well-recognized, the means to achieve this objective using phosphorus compounds is also at odds with the moisture content history of the resin. If all resins could be uniformly maintained at a constant moisture content, regardless of storage conditions, there would be no problem of molecular weight build-up in the melt state over time. However, the condition of unchanging moisture content practically never exists for resins in molding and extrusion applications. In general, there exists a variability in the resin moisture levels prior to melting and also for the duration of time in the melted state. Often users of nylon resins in molding and extrusion processes "over-dry" their polymers. The over-dried polymer has a low moisture content which in combination with the catalytic effects of phosphorous compounds, used to maintain high stability and whiteness, drive the molecular weight of the polymer objectionably high. Consequently, a higher than desired, or even a not easily predicted melt viscosity situation exists and molding defects due to melt flow problems result.

There remains in the art an unmet need for a nylon molding resins which can be processed in a predictable and reproducible manner regardless of prior melt history and moisture content. Nylon molding resins having a low yellowness and excellent whiteness stability as a result of phosphorous compound addition and having predictable molecular weight build-up in the melt (or fluid) state are desirable.

SUMMARY OF THE INVENTION

In some embodiments, the disclosures herein pertain to a modified nylon polymer comprising:
a first additive and a second additive; and
wherein the first additive is provided to the polymer in an amount comprising about 150 to about 300 parts per million by weight; and
wherein the second additive is provided to the polymer in an amount comprising about 10 to about 50, preferably about 10 to about 17, moles per million grams of polymer; and
wherein the first additive is sodium hypophosphite; and
wherein the second additive is selected from the group consisting of: acetic acid, propionic acid, benzoic acid, and succinic acid.

In some embodiments, the disclosures herein pertain to the foregoing modified nylon polymer comprising a second additive consisting of acetic acid in an amount of about 600 to about 3000, preferably about 600 to about 1000, parts per million by weight.

In some embodiments, the disclosures herein pertain to the foregoing modified nylon polymer comprising polyhexamethylene adipamide.

In some embodiments, the disclosures herein pertain to a system for providing an injection molding resin, which is preferably a nylon polymer, in the fluid state to an injection molding machine, the system comprising:
a. providing a preferably nylon polymer molding resin containing at least a portion of at least one, preferably phosphorus-based, polymerization catalyst and at least a portion of at least one, preferably lower carboxylic acid, end-capping additive,
b. melting the resin by the addition of sufficient heat to effect a solid to fluid state transition, and
c. transporting the resin in a fluid state to an injection molding machine.

In another embodiment of the foregoing system, the molding resin is selected from nylon resins, preferably nylon-6,6, and the at least one polymerization catalyst is selected from polyamidation catalysts and the at least one end-capping additive is selected from, preferably lower, mono- and dicarboxylic acids.

In yet another embodiment of the foregoing system, the at least one polymerization catalyst is sodium hypophosphite and the at least one end-capping additive is selected from the group consisting of: acetic acid, propionic acid, benzoic acid, and succinic acid.

Further, in some embodiments, the disclosures herein pertain to a process for providing a nylon injection molding resin in fluid state to an injection molding machine, the process comprising the steps of:
a. providing the nylon resin having a first relative viscosity (RV) measurement and a water content of less than about 0.15%, and preferably less than about 0.1%, by weight and further containing at least a portion of at least one, preferably phosphorus-based, polyamidation catalyst and at least a portion of at least one, preferably lower carboxylic acid, end-capping additive, b. melting the nylon resin by the addition of sufficient heat to effect a solid to fluid state transition, wherein the fluid state nylon resin is characterized by a second relative viscosity (RV) increased by less than about 16, preferably about 13, more preferably about 10, RV units from the first relative viscosity (RV) measurement, and c. transporting the nylon resin in a fluid state to the mold cavity of an injection molding machine.

In another embodiment of the foregoing process the at least one polymerization catalyst is selected from polyamidation catalysts and the at least one end-capping additive is selected from, preferably lower, monocarboxylic acids.

In yet another embodiment of the foregoing process the at least one polymerization catalyst is sodium hypophosphite and the at least one end-capping additive is selected from the group consisting of: acetic acid, propionic acid, benzoic acid, and succinic acid.

DETAILED DESCRIPTION

Although the following detailed description contains many specifics for the purpose of illustration, a person of ordinary skill in the art will appreciate that many variations and alterations to the following details are within the scope of the herein disclosed embodiments.

Accordingly, the following embodiments are set forth without any loss of generality to, and without imposing limitations upon any claimed invention. Before the present disclosure is described in greater detail, it is to be understood that this disclosure is not limited to particular embodiments described, as such may vary. It is also to be understood that the terminology used herein is for the purpose of describing particular embodiments only, and is not intended to be limiting, since the scope of the present disclosure will be limited only by the appended claims.

It has been found that a polyamide polymer, particularly nylon 66, having low yellowness and excellent whiteness retention can be prepared by addition of a phosphorus-based anti-yellowing agent such as sodium hypophosphite (SHP), in an amount of 150 to 300 ppm by weight, prior to or during polymerization. This nylon polymer experiences a molecular weight increase more rapidly than a comparable nylon polymer without SHP or with a substantially lower amount of SHP. The molecular weight increase is understood to be due to the catalytic effects of phosphate species, formed from SHP during the nylon polymerization (polyamidation) process. For the industrial applications of melt extrusion and injection molding, this relatively rapid increase in molecular weight is not desirable.

It has also been found that an "end cap" additive of a "lower", i.e., $C_1$-$C_4$, mono- or dicarboxylic acid such as acetic acid, propionic acid, benzoic acid, or succinic acid, added at the start of polymerization, can effectively mitigate the observed molecular weight gain in nylon 66 made with an effective amount of SHP. It was found that a particularly effective amount of "end cap" additive in SHP modified nylon 66 is about 10 to about 50 moles, preferably about 10 to about 17, moles per million grams of final polymer by weight. In the case of acetic acid, this amount is equivalent to about 600 to about 3000 ppm, preferably about 600 to 1000 ppm, compared to final polymer mass.

The nylon polymers of the embodiments herein can comprise substantially aliphatic polyamides. That is, the repeating amide groups are linked substantially by aliphatic groups. Herein, the term "amide-forming moiety" is used in reference to the radical of a diacid, diamine, or lactam. For example, the amide-forming moieties of nylon 66 are derived from the monomers: hexamethylene diamine (HMD) and the dicarboxylic acid monomer adipic acid; and the polymer is referred to polyhexamethylene adipamide.

For the industrial applications of melt extrusion and injection molding, the melt flow characteristics of nylon 66 are very good. The crystalline melting point of nylon 66 is known to be quite sharp at 265° C. and good fluidity is observed at about 270° C. to 300° C. It is also well-known that nylon 66 in the melt state deviates from Newtonian behavior at these temperatures for processing. Such behavior means the melt viscosity decreases significantly as the injection pressure (shear stress) or the injection speed (shear rate) is increased. As a result, it is observed that the melt becomes more fluid as these injection molding variables are increased. The nylon 66 temperature dependence of the melt flow is also known to lower viscosity and thus serves to improve the flow as temperature is increased. These complex fluid flow relationships become the leverage points for melt flow behavior in an injection molding processes. Thus, having a predictable and adjustable control of nylon 66 fluid flow as a function of molecular weight, for which a proxy measurement is relative viscosity RV, is desired.

Other nylon polymers useful in the processes herein disclosed are well-known in the art and include polyamides obtained by condensation of diacids and diamines or salts thereof, polyamides which are the condensation product of lactams or aminoacids, and polyamides which are prepared by reaction of an omega-amino nitrile or mixture of a diamine and dinitrile in the presence of water.

Homopolyamides obtained from the condensation of a single diamine and a single diacid and interpolyamides obtained by condensation of a mixture of two or more diamines with one or more diacids or a mixture of two or more diacids with one or more diamines can be used. Mixtures of two or more polyamides can also be used. Diacids including adipic acid, sebacic acid, suberic acid, dodecanedioic acid, azelaic acid, terephthalic acid, and isophthalic acid are more useful. Diamines including hexamethylene diamine, tetramethylene diamine, pentamethylene diamine, and 2-methyl pentamethylene diamine and useful within the scope of these disclosures.

Homopolyamides or interpolyamides formed by reaction of aminocarboxylic acids or the corresponding lactams or interpolyamides thereof with diamines and diacids can also be used. Aminocarboxylic acids or the corresponding lactams having 6-12 carbons including caprolactam, laurolactam, enantholactam, omega-aminoundecanoic acid, and aminododecanoic acid are useful within the scope of these disclosures.

The nylon polymers useful within scope of these disclosures can, in addition, and optionally include additives such as: flame retardants, lubricants, pigments and dyes, optical brighteners, organic antioxidants, plasticizers, heat stabilizers, ultraviolet light stabilizers, nucleating agents, tougheners, and reinforcing agents.

Preparation of the nylon polymers useful within the scope of these disclosures is effected by polymerization processes generally known to the skilled person. For example, such processes include the batch autoclave or discontinuous method and the continuous or CP method.

According to the conventional batch autoclave method, a 40-60% polyamide salt solution formed from equimolar amounts of diacid and diamine in water, is charged into a pre-evaporator vessel operated at a temperature of about 130-160° C. and a pressure of about 240 to about 690 kPa absolute, wherein the polyamide salt solution is concentrated to about 70-80%. This concentrated solution is transferred to the autoclave, where heating is continued as the pressure in the vessel rises to about 1100 to about 4000 kPa absolute. Steam is vented until the batch temperature reaches about 220-260° C. The pressure is then reduced slowly (over about 20-60 minutes) to about less than 110 kPa absolute. The polymer molecular weight is controlled by the hold time and pressure at this stage. Salt concentration, pressure, and temperature may vary depending on the specific polyamide being processed. After the desired hold time, the polyamide is then extruded into strand, cooled, and cut into pellets (also known as granulates).

In this batch process, the phosphorus compound or carboxylic acid additive can be introduced before polymerization (i.e., into a solution of at least one polyamide-forming reactant), or can be introduced at any point during polymerization, or can even be introduced post-polymerization (i.e., by incorporating the phosphorus compound and the carboxylic acid into a polyamide melt, using conventional mixing equipment, such as an extruder). The phosphorus compounds and carboxylic acid additives can be introduced separately or all at once. As a means for protection against oxidation and thermal degradation, the phosphorus compound and carboxylic acid additives are provided early in the polymerization process, such as at the beginning of the polymerization process. Additives which may be in solid form can be provided they can be as solids or in the form of aqueous solutions.

Continuous polymerizations (CP) are known to the skilled person from at least the disclosures of W. H. Li in U.S. Pat. No. 3,113,843. In the continuous method, the polyamide salt solution is transferred into a pre-evaporator/reactor where the salt solution is concentrated at about 1350 to about 2000 kPa absolute and about 200-260° C. to about 85-90%, resulting in a low molecular weight polymer. The low molecular weight polymer is then discharged into a flasher, where the pressure is slowly reduced to below 100 kPa absolute and discharged into a vessel maintained below atmospheric pressure and at a temperature of about 270-300° C. to effect removal of water and to promote further molecular weight increase. The polyamide melt is then extruded into a strand, cooled, and cut into pellets.

As in the batch method, the phosphorus compounds and carboxylic acids can be incorporated at any point during the process, including post-polymerization (i.e., by compounding them into the polyamide melt, etc.). However, for maximum antioxidant and thermal protection, it is known to the skilled person that the phosphorus compounds and carboxylic acid additives provided prior to polymerization, or as early as possible, is more desirable.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure employ, unless otherwise indicated, techniques of chemistry, and the like, which are within the skill of the art. Such techniques are explained fully in the literature.

The following examples are put forth so as to provide those of ordinary skill in the art with a complete disclosure and description of how to perform the methods and use the compositions, compounds and systems disclosed and claimed herein. Efforts have been made to ensure accuracy with respect to numbers (e.g., amounts, temperature, etc.), but some errors and deviations should be accounted for.

Unless indicated otherwise: parts are parts by weight, temperature is in ° C., and pressure is in kPa absolute. Standard temperature and pressure are defined as 25° C. and 101 kPa (one atmosphere).

Before the embodiments of the present disclosure are described in detail in the examples, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

As used herein, for both the specification and the appended claims, the singular forms "a," "an," and "the" include plural referents unless the context clearly dictates otherwise. Thus, for example, reference to "an additive" includes a plurality of additives. In this specification and in the claims that follow, reference will be made to a number of terms that shall be defined to have the following meanings unless a contrary intention is apparent.

Test Methods

As used herein, the following terms and test procedures are defined as follows:

Melting point (MP). The exothermic peak which occurs during heating of small samples in a differential scanning calorimeter (DSC) (ASTM D3417).

Relative viscosity (RV). The relative viscosity compares the viscosity of a solution of polymer in formic acid with the viscosity of the formic acid itself (ASTM D-789). The test results reported in this specification were obtained using nylon 66 dissolved in formic acid to provide an 8.4% by weight solution at 25° C.

Melt viscosity (MV). An indicator of the melt flow characteristic of a resin as measured in Pascal seconds (Pa.sec) with a Kayeness Capillary Rheometer measured at 280° C. under constant flow rate conditions.

Glass transition temperature ($T_g$) The damping peak which occurs between the hard glassy phase and the rubbery phase during heating of material on a dynamic mechanical analyzer (DMA) (ASTM 4065).

Molecular weight. Unless otherwise indicated, all molecular weights are given as number average molecular weights.

Yellowness Index (YI), is conveniently measured in accordance with ASTM D1925 using a spectrometer from Hunter Lab (e.g., Model D25LT used for coarse samples). YI is a measure of the degree of yellowness exhibited by a resin. The more positive YI values indicate a more yellow appearance for the nylon resin.

EXAMPLES

The following examples are provided to illustrate the present invention. The examples are not intended to limit the scope of the present invention and should not be so interpreted. It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'".

In an illustration of an embodiment disclosed herein the following experiment is undertaken. First, an end-capped nylon 66 polymer is prepared according to the known polymerization process in a batch autoclave. The additive sodium hypophosphite (SHP) is included during polymerization and is provided in an amount to achieve 180 parts per million by weight in the finished polymer. End-capping herein means that a fixed portion of the free amine ends of the nylon polymer are contacted with a carboxylic acid function compound, e.g., acetic acid, during polymerization in the batch autoclave. The end-capping content corresponds to 600 ppm acetic acid by weight in the finished polymer. This end-capped polymer is discharged from the autoclave and processed into strands in the known manner and granulated to form uniform pellets or granulate. These polymer granulates are dried to moisture content of about 0.12% by weight. The dried granulate is subjected to an RV measurement. A sample of the measured granulate is melted in a capillary viscometer at 280° C. and maintained at this temperature for 5 minutes. Afterwards the polymer is extruded from the viscometer and again subjected to an RV measurement. The difference in RV measurements before and after melting is noted. This difference is (55.0-47.0)=8 RV units.

An identical nylon polymer without end-capping is prepared in the same manner in a batch autoclave. The additive sodium hypophosphite (SHP) is included during polymerization and is provided in an amount to achieve 180 parts per million by weight in the finished polymer. No amine end-capping carboxylic acid is provided. This polymer is granulated to form uniform granulates in the same manner and dried to moisture content of about 0.12% by weight. The dried granulate is subjected to an RV measurement. A sample of the measured granulate is melted in a capillary viscometer at 280° C. and maintained at this temperature for 5 minutes. Afterwards the polymer is extruded from the viscometer and again subjected to an RV measurement. The difference in RV measurements before and after melting is noted. This difference is (72.5-49.1)=23 RV units.

This difference in RV increase observed for nylon polymers containing a phosphorous compound stabilizer with and without end-capping carboxylic acid corresponds to differences in molecular weight build, while being maintained at the melt temperature. It is believed that amine end-capping the nylon polymer shifts the final equilibrium molecular weight achievable without deactivation of the catalytic effects of SHP to build molecular weight in the melt.

In addition to acetic acid, other monocarboxylic acids are effective end-cappers, e.g., propionic acid and benzoic acid. The dicarboxylic acid, succinic acid, is also suitable because it forms a stable cyclic imide structure effectively removing the second carboxylic acid function.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A modified polyamide formed from a solution consisting of at least one polyamide-forming reactant, wherein a first additive and a second additive were introduced into the solution before or during polymerization, or after polymerization into a polyamide melt; and wherein the first additive is provided in an amount sufficient to yield about 150 to about 300 parts per million by weight of the polyamide; and wherein the second additive is provided in an amount sufficient to yield about 10 to about 50 moles per million grams of the polyamide; and wherein the first additive is sodium hypophosphite; and wherein the second additive is selected from the group consisting of: acetic acid, propionic acid, benzoic acid, and succinic acid.

2. The modified polyamide of claim 1 wherein the second additive is provided in an amount sufficient to yield about 10 to about 17 moles per million grams of the polyamide.

3. The modified polyamide of claim 1 comprising polyhexamethylene adipamide.

4. A process for providing a nylon polymer injection molding resin in fluid state to the mold cavity of an injection molding machine, the process consisting of:

a. providing a nylon polymer molding resin containing at least a portion of at least one phosphorus-based polymerization catalyst and at least a portion of at least one lower carboxylic acid end-capping additive, wherein the one phosphorus-based polymerization catalyst is provided in an amount sufficient to yield about 150 to about 300 parts per million by weight of the nylon polymer molding resin, and wherin the one lower carboxylic acid end-capping additive is provided in an amount sufficient to yield about 10 to about 50 moles per million grams of the nylon polymer molding resin;

b. melting the resin by the addition of sufficient heat effect a solid to fluid state transition; and c. transporting the resin in a fluid state to the mold cavity of an injection molding machine.

5. The process of claim 4 wherein the molding resin is selected from nylon-6,6 resins and wherein the at least one polymerization catalyst is selected from polyamidation catalysts and the at least one end-capping additive is selected from lower mono- and dicarboxylic acids.

6. The process of claim 4 wherein the at least one polymerization catalyst is sodium hypophosphite and the at least one end-capping additive is selected from the group consisting of: acetic acid, propionic acid, benzoic acid, and succinic acid.

7. A process for providing a nylon injection molding resin in fluid state to the mold cavity of an injection molding machine, the process consisting of:

a. providing the nylon resin having a first relative viscosity (RV) measurement and a water content of less than 0.15% by weight and further containing at least a portion of at least one phosphorus-based polyamidation catalyst and at least a portion of at least one lower carboxylic acid end-capping additive, wherein the one phosphorus-based polymerization catalyst is provided in an amount sufficient to yield about 150 to about 300 parts per million by weight of the nylon polymer molding resin, and wherin the one lower carboxylic acid end-capping additive is provided in an amount sufficient to yield about 10 to about 50 moles per million grams of the nylon polymer molding resin;

b. melting the nylon resin by the addition of sufficient heat effect a solid to fluid state transition, wherein the fluid state nylon resin is characterized by a second relative viscosity (RV) increased by less than about 16 RV units from the first relative viscosity (RV) measurements; and c. transporting the nylon resin in a fluid state to the mold cavity of an injection molding machine.

8. The process of claim 7 wherein the nylon resin having a first relative viscosity (RV) has a water content of less than 0.10% by weight and wherein the fluid state nylon resin is characterized by a second relative viscosity (RV) increased by less than about 10 RV units from the first relative viscosity (RV) measurement.

9. The process of claim 7 wherein the at least one polymerization catalyst is selected from polyamidation catalysts and the at least one end-capping additive is selected from monocarboxylic acids.

10. The process of claim 7 wherein the at least one polymerization catalyst is sodium hypophosphite and the at least one end-capping additive is selected from the group consisting of: acetic acid, propionic acid, benzoic acid, and succinic acid.

* * * * *